Patented Apr. 11, 1944

2,346,256

UNITED STATES PATENT OFFICE 2,346,256

INSECTICIDAL COMPOSITION

Mortimer T. Harvey, East Orange, N. J., assignor to The Harvel Corporation, a corporation of New Jersey No Drawing. Application May 15, 1940,
Serial No. 335,332

9 Claims. (Cl. 167—24)

The present invention relates to insecticidal solutions in which either insecticidal rotenone or insecticidal pyrethrin or both these products serve as the effective insecticide and certain phenolic materials serve as solvents for the application of the effective insecticide.

The phenolic materials used in the practice of the present invention are good solvents for rotenone products and for pyrethrin products and are good cosolvents for petroleum oils together with either or both of the rotenone and pyrethrin products.

The phenolic materials used in the practice of the present invention are suitable also for making emulsion of water with the effective insecticide use, either or both the rotenone and pyrethrin products, either with or without a petroleum oil or other material such as soap solutions.

Illustrative examples of the phenolic materials suitable for use in the practice of the present invention are, generally, phenols having from five to twenty-six carbon atoms as hydrocarbon substituents on the nucleus of the phenol and resinous condensation products of such phenols of the phenol-aldehyde type. More particularly, illustrative examples of phenolic materials suitable for use in the practice of the present invention are those liquids and saps or juices obtained from and containing phenols which are characteristic of the flora family Anacardiaceae, for example, cashew nut shell liquid, marking nut shell liquid, Japanese lac, and the several phenolic constituents and derivatives of the Anacardiaceae liquids and saps such as anacardic acid, cardol, cardanol, anacardol, urushiol, and so on and resinous condensation products of these phenols such as products of condensation reaction with material such as formaldehyde, acetaldehyde, paraformaldehyde, paraldehyde, furfuraldehyde and hexamethylene tetramine, that is with reagents containing reactive methylene groups or aldehyde groups.

The present invention relates further to insecticidal solutions in which insecticidal rotenone products serve as the effective insecticide, petroleum oil is used as the diluent and carrier, and phenol-aldehyde resins which are soluble in petroleum oils and which will dissolve the rotenone products serve to hold the latter in solution in the petroleum oils.

The phenols used in making the phenol-aldehyde condensation products suitable for use in the practice of the present invention are phenols having long hydrocarbon side-chain substituents on the nucleus thereof. Some of these long hydrocarbon side-chain substituted phenols are found to be naturally occurring in the juices of plants of the Anacardiaceae family. Examples of these, defined phenols are cashew nut shell liquid; marking nut shell liquid; the juice of the Japanese lac plant; the naturally occurring phenolic constituents of cashew nut shell liquid, of marking nut shell liquid and of the juice of the Japanese lac plant, for example, anacardic acid, cardol, anacardol, urushiol, and other long hydrocarbon side-chain substituted phenols found in these juices. Further examples are phenols and other compounds which are derivatives of the above defined phenols, that is, cardanol; any of the above defined phenols which has been modified by hydrogenation to satisfy the unsaturated bond of the long hydrocarbon side-chain, including hydrogenated cardanol; acid treated cashew nut shell liquid; slightly polymerized cashew nut shell liquid; acetic acid derivatives of any of the above phenols such as cardanoxy acetic acid; acetates of any of the above phenols.

Still further examples of phenols suitable for making phenol aldehyde condensation products suitable for use in the practice of the present invention are phenols having hydrocarbon side-chains of four or more carbons on the nucleus of the phenol and which give oil soluble condensation products with an aldehyde, for example, the group of phenols from the several butyl phenols to phenols having twenty carbon atoms in one or more groups on the nucleus, but with at least one of the readily reactive positions (ortho and para) unoccupied. Particular examples are p-tertiary butyl phenol, any lauric phenol, and hydrogenated cardanol and general examples are those phenols which give oil soluble resins by condensation reaction with an aldehyde. The group of phenols suitable for use for condensation with an aldehyde to obtain oil soluble resins suitable for use in the practice of the present invention include both those having saturated and unsaturated side chains and having at least one readily reactive position (ortho or para) on the nucleus unoccupied and generally includes those having from about five to about twenty-six carbon atoms in a substitution group.

The cashew nut shell liquid suitable for use in the practice of the present invention is that removed from the cashew nut shell by cold pressing, by heating at small degree of elevation of temperature or at high elevation, or by extraction with a solvent.

Cardanol is a phenol having a hydrocarbon chain of about fourteen carbon atoms on the nucleus, with an unsaturated group in said chain, and is described in my Patent Number 2,098,824. The molecular weight is about 288.

The phenol-aldehyde condensation products herein described as suitable for the practice of the present invention are liquid or solid resinous products.

The aldehydes suitable for making the phenol-aldehyde condensation products useful in the practice of the present invention are formaldehyde, paraformaldehyde, paraldehyde, acetaldehyde, furfuraldehyde, and also other materials which will supply a reactive methylene group such as hexamethylene-tetramine.

The rotenone bearing materials suitable for use in the practice of the present invention are derris root extract, derris resinate, barbasco, cube, timbo, and other effective insecticidal forms of rotenone, and also chemically or technically pure rotenone.

Examples of the petroleum oils suitable for use in the practice of the present invention are kerosene, gasoline, fuel oil, petrolatum (petroleum jellies), and regular spray oils, for example those having viscosity of from about 70 to about 95 Saybolt.

Particular illustrative examples of insecticide compositions of the present invention are as follows:

*Example 1*

One part by weight of insecticidal extract of derris root is dissolved in ten parts by weight of a liquid condensation product of formaldehyde and cardanol by warming. When complete solution is obtained there is added one hundred parts by weight of a petroleum spray oil having a viscosity of from 70 to 95 Saybolt, which spray oil goes completely into solution with the other named materials.

The formaldehyde-cardanol condensation product can be made by heating from one-half to one-quarter moles of formaldehyde with a mole of cardanol, in the presence of ammonia, under a reflux condenser, at about 205° C., for about one hour, and then dehydrated. The resulting condensation product is a liquid resinous material which dissolves rotenone products, is soluble in petroleum oils and will hold rotenone and rotenone material in solution in petroleum oils.

*Example 2*

A similar product can be made by using urushiol in place of cardanol by the method and in the proportions given in Example 1, above.

*Example 3*

The method of Example 1, above is used with the difference that cashew nut shell liquid is used in place of cardanol.

*Example 4*

A quantity of cashew nut shell liquid is mixed with a mixture comprising about two and a half per cent of its weight of concentrated sulphuric acid and five per cent of its weight of water and gradually brought up to about 300° F., when it is drawn off and filtered to remove precipitated salts of metals naturally occurring in cashew nut shell liquid. These precipitated salts are separated and the so treated cashew nut shell liquid can be used in place of and in substantially the same proportions as the cardanol of Example 1, above.

*Example 5*

About one mole of cardanol (molecular weight about 288) and one mole equivalent (of reactive methylene group) of hexamethylene tetramine are heated at from about 250° F. to about 270° F. until a resinous condensation product of a heavy molasses consistency is obtained.

This material can be used in the manner and method given in Example 1 to hold rotenone products in solution in petroleum oils.

*Example 6*

One mole of para-tertiary amyl phenol and from about one to about one and one-quarter mole of formaldehyde are added slowly into sufficient caustic soda solution which is at 125° F. to dissolve the tertiary amyl phenol and the formaldehyde. The solution is left to stand at room temperature for about forty-eight hours after which it is neutralized and dehydrated. The resulting liquid resin is suitable for use in the manner of Example 1 to hold rotenone products in solution in petroleum oils.

*General example*

The other phenols named above can be used in the same or in a similar method to that given in Example 1 for the preparation and use of the phenol-aldehyde resin, all of them generally and hydrogenated cardanol and the acid treated cashew nut shell liquid of Example 4 when hydrogenated, in particular. Also mixture of two or more of the phenols above cited can be used to suit particular cases.

Certain dilutions of rotenone in petroleum oils, by means of phenol-aldehyde resins, are given above but limitations thereof are not made within the limits of solubility for different ingredients of the general kinds named and for various proportions used to suit a great variety.

The rotenone-phenol aldehyde resin-petroleum oil compositions above described and exemplified are suitable for use and application either with or without water. When used with water they are made into a finely divided emulsion.

The present invention relates further to insecticidal solutions in which insecticidal rotenone products serve as the effective insecticide, petroleum oil is used as the diluent and carrier, and phenols of the Anacardiaceae family which are soluble in petroleum oils and which will dissolve the rotenone products serve to hold the latter in solution in the petroleum oils.

The phenols suitable for use in the practice of the present invention are phenols having long hydrocarbon side-chain substituents on the nucleus thereof. Some of these long hydrocarbon side-chain substituent phenols are found to be naturally occurring in the juices of plants of the Anacardiaceae family. Examples of these, defined phenols are cashew nut shell liquid; marking nut shell liquid; the juice of the Japanese lac plant; the naturally occurring phenolic constituents of cashew nut shell liquid, or marking nut shell liquid and of the juice of the Japanese lac plant, for example, anacardic acid, cardol, anacardol, urushiol, and other long hydrocarbon side-chain substituted phenols found in these juices. Further examples are phenols and other compounds which are derivatives of the above defined phenols, that if for example: cardanol; any of the above defined phenols which has been modified by hydrogenation to satisfy the unsaturated bond of the long hydrocarbon side-chain, including hydrogenated cardanol; acid treated cashew nut shell liquid; slightly polymerized cashew nut shell liquid; acetic acid derivatives of any of the above phenols such as cardanoxy acetic acid; acetates of any of the above phenols.

Generally, phenols suitable for use in the practice of the present invention are phenols having hydrocarbon side-chains of from about ten to twenty carbon atoms on the phenol nucleus.

The cashew nut shell liquid suitable for use in the practice of the present invention is that removed from the cashew nut shell by cold pressing, by heating at small degree of elevation of temperature or at high elevation, or by extraction with a solvent. Before being made up into an insecticidal solution with a rotenone product, the cashew nut shell liquid can be treated to remove naturally occurring metals by a method such as is described in Patent Number 2,067,919.

Cardanol is a phenol having a hydrocarbon chain of about fourteen carbon atoms on the nucleus, with an unsaturated group in said chain, and is described in my Patent No. 2,098,824. The molecular weight is about 288.

Examples of the rotenone bearing materials suitable for use in the practice of the present invention, are derris root extract, derris resinate, barbasco, cube, timbo, and other effective insecticidal forms of rotenone, and also chemically or technically pure rotenone.

Examples of the petroleum oils suitable for use in the practice of the present invention are kerosene, gasoline, fuel oil, petroleum (petroleum jellies), and regular spray oils, for example those having viscosity of from about 70 to about 95 Saybolt.

Example 7

One part by weight of derris root extract is dissolved in twenty parts of cardanol and this solution is dissolved in four hundred parts of kerosene. This gives a clear solution adapted for application by spraying and otherwise.

Example 8

A solution similar to that of Example 7 above is made up, but using cashew nut shell liquid instead of cardanol.

Either the raw or commercial cashew nut shell liquid or cashew nut shell liquid from which naturally occurring salts have been removed can be used.

Example 9

Marking nut shell liquid is substituted for the cardanol of Example 7.

Example 10

Urushiol, from the Japanese lac plant, can be substituted in Example 7 for the cardanol.

The proportions of the ingredients in the above examples are merely illustrative and are not limiting because the rotenone products and the petroleum oils are soluble in the Anacardiaceae phenols in proportions over considerable ranges, and variations in proportions can be made to suit the particular purposes to which the insecticide is to be applied and to suit the method of applying.

The rotenone-petroleum-phenol solutions of the present invention can be applied by mixing with water and spraying and can be applied in various other ways known in the art for applying liquid insecticides.

General example

The other phenols above can be used in the same or in a similar method to that given in Example 1 for the preparation and use of the phenol, all of them generally and hydrogenated cardanol and the acid treated cashew nut shell liquid of Example 10 when hydrogenated, in particular. Also mixture of two or more of the phenols above cited can be used to suit particular cases.

Certain dilutions of rotenone in petroleum oils, by means of Anacardiaceae phenols, are given above but limitations thereof are not made within the limits of solubility for different ingredients of the general kinds named and for various proportions used to suit a great variety.

The rotenone-Anacardiaceae phenol-petroleum oil compositions above described and exemplified are suitable for use and application either with or without water. When used with water they are made into a finely divided emulsion.

Also, the Anacardiaceae phenol-petroleum oil solution of the present invention can be used to extract the insecticidal rotenone material from their sources, whatever the latter are. For example, derris root (or other root) can be comminuted and put into a cashew nut shell liquid-kerosene solution, with or without heating, to dissolve the insecticidal rotenone product after which the solution is filtered from the comminuted solids and the filtered solution can be used as such as an insecticide or it can be made up by the addition of further amounts of petroleum oil.

Further, any of the Anacardiaceae phenols which are in liquid state, either hot or cold, can be used, without the kerosene or other petroleum oil, for extracting the insecticidal rotenone product by solution of the latter, with or without heating, and then preferably filtered from the comminuted solids. Illustrative examples are cashew nut shell liquid, cashew nut shell liquid polymer in the liquid state and cardanol. The Anacardiaceae phenol-rotenone solution can be sold as such for dilution, as for example with kerosene, or it can be as an insecticide without solvent dilution in which case it could be used and applied as such or used with water for spray distribution, for example.

The present invention relates further generally to insecticides and the present invention relates more particularly to insecticides in the emulsion form in which cashew nut shell liquid or another phenol having similar characteristics serves both as an insecticide and as an agent to form an emulsion.

The following examples are given to further illustrate the present invention.

Example 11

One hundred parts by volume of water and one hundred parts of a potassium soap of oleic acid and fifty parts of cashew nut shell liquid are thoroughly mixed together, thereby forming an emulsion. This emulsion is suitable for application to plants by spraying or otherwise and can be diluted with additional quantities of water to suit particular applications.

The cashew nut shell liquid can be replaced all or in part with polymerized cashew nut shell liquid of various viscosities to suit particular needs within the knowledge and skill of a gardener.

Example 12

About one hundred parts by volume of a five per cent potassium oleate soap solution in water, ninety-five parts of a petroleum oil and five parts of cashew nut shell liquid are thoroughly mixed together to make an emulsion.

Example 13

About two hundred parts by weight of cashew nut shell liquid which has been polymerized to a viscosity of about twenty-five seconds through an Armour pipette, ten parts of oleic acid, two and one-half parts of potassium hydroxide, 0.025 part of beta naphthol and about two hundred and twenty parts of water are mixed together to make an emulsion.

In each of the above illustrative examples the amounts of ingredients are approximate and can be varied somewhat without losing the advantages of the present invention, and in each of the above examples cashew nut shell liquid, polymerized cashew nut shell liquid, cardanol, urushiol and derivatives of these can be substituted for all or part of the corresponding phenol given in any of the examples. The amount of water can be varied considerably to obtain desired consistencies to suit conditions of application and so on. Also, other soaps can be used such as sodium soap of oleic acid or the soda or potash soaps of linoleic acid or other equivalent soaps suitable for making emulsions with cashew nut shell liquid, cardanol, urushiol, or one of these phenols in a polymerized, liquid state. In similar formulas the soap solution can be eliminated and the emulsion made of a solution of cashew nut shell liquid (or equivalent or similar phenol as above described) in a petroleum oil and water. In these as well as in the cases where soap solution is used the proportion of the described phenol to petroleum oil can be from about five to about twenty-five parts of the former to from about ninety-five to about seventy-five parts of the latter, for example, an even greater quantity of the phenol in proportion can be used. The petroleum oil, for example, can be kerosene, gasoline, fuel oil, petroleum (petroleum jellies), and regular spray oils, for example, those having a viscosity of from about 70 to about 95 Saybolt.

The rotenone products described in above Examples 1 to 10, inclusive, can be used in above Examples 11, 12 and 13 substantially in the proportions to the described phenols as they are set forth in said Examples 1 to 10, inclusive, as set forth above.

In each of the above particular Examples 1 to 13 and general examples a solution of cashew nut shell liquid and cashew kernel oil can be used in place of cashew nut shell liquid when used and the corresponding derivative product made from the solution of cashew nut shell liquid and cashew kernel oil can be used in place of the derivative product of cashew nut shell liquid, as the case may be. For example, if an aldehyde resin of cashew nut shell liquid or of a cashew nut shell liquid derivative is used then a corresponding resin made from the solution of cashew nut shell liquid and cashew kernel oil or from the derivative of the solution of cashew nut shell liquid and cashew kernel oil can be used.

Also in each of the Examples 1 to 13, in the general examples, and with the corresponding products in which the solution of cashew nut shell liquid and cashew kernel oil or derivatives of the solution of cashew nut shell liquid and cashew kernel oil, pyrethrin (or pyrethrin insectical product) can be substituted for all or part of the insecticidal product, in proportions ranging from effective amounts of pyrethrin with the rotenone product to complete substitution.

The present application is a continuation-in-part of my copending applications Serial Number 271,515, filed May 3, 1939 (now Patent 2,242,911, issued May 20, 1941); Ser. No. 275,901, filed May 26, 1939, and Ser. No. 288,993, filed Aug. 8, 1939.

Having thus described my invention, what I claim and desire to protect by Letters Patent is:

1. An insecticidal solution comprising an insecticidal rotenone product dissolved in a solution of cashew nut shell liquid and cashew kernel oil.

2. An insecticidal solution comprising an insecticidal rotenone product and a petroleum oil in solution in a solution of cashew nut shell liquid and cashew kernel oil.

3. An insecticidal composition comprising water mixed with a solution of an insecticidal rotenone product dissolved in a solution of cashew nut shell liquid and cashew kernel oil.

4. An insecticidal composition comprising water mixed with a solution of an insecticidal rotenone product and a petroleum oil in a solution of cashew nut shell liquid and cashew kernel oil.

5. An insecticidal solution comprising a solution of material selected from the group consisting of pyrethrin and an insecticidal rotenone product in a solution of cashew nut shell liquid and cashew kernel oil.

6. An insecticidal composition comprising water mixed with a solution of material selected from pyrethrin and an insecticidal rotenone product in a solution of cashew nut shell liquid and cashew kernel oil.

7. An insecticidal composition comprising water mixed with a solution of a petroleum oil and material selected from pyrethrin and an insecticidal rotenone product in a solution of cashew nut shell liquid and cashew kernel oil.

8. In an insecticide, in combination, an insecticidal plant product selected from the group consisting of rotenone products and pyrethrin products and a solution of cashew kernel oil in cashew nut shell liquid.

9. In an insecticide, in combination, an insecticidal plant product selected from the group consisting of rotenone products and pyrethrin products, a petroleum oil, cashew kernel oil and cashew nut shell liquid.

MORTIMER T. HARVEY.